E. W. Nichols,
Tedder.

No. 98,292.

2 Sheets, Sheet. 1.

Patented. Dec. 28, 1869.

Witnesses

Inventor
E. W. Nichols

E. W. Nichols.
Tedder.

2 Sheets, Sheet 2.

No. 98,292.

Patented Dec. 28, 1869.

Witness
L. Thayer
Jas. G. Arnold

Inventor E. W. Nichols
per Attorney

United States Patent Office.

EBEN W. NICHOLS, OF WORCESTER, MASSACHUSETTS.

Letters Patent No. 98,292, dated December 28, 1869.

IMPROVEMENT IN HAY-SPREADERS.

The Schedule referred to in these Letters Patent and making part of the same.

*To all whom it may concern:*

Be it known that I, EBEN W. NICHOLS, of the city and county of Worcester, and State of Massachusetts, have invented certain Improvements in Hay-Spreaders, of which the following is the specification.

My invention relates to that class of machines whose object is to stir up the cut grass, and give it more air, to make it cure faster.

In the accompanying drawings—

Figures 1, 2:
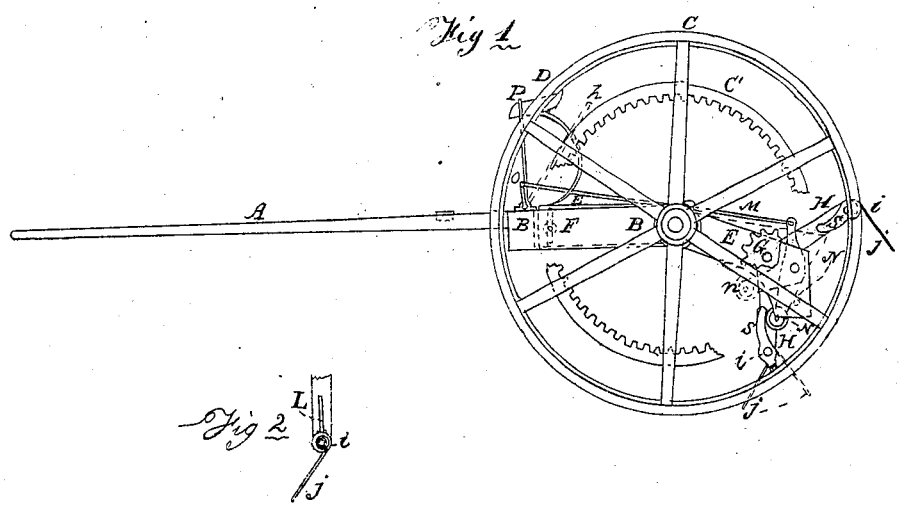
Figure 1 shows a side view of a hay-spreader, embodying my invention; parts of the driving-gear and pinion are represented as broken away, to show other parts more plainly.
Figure 2 shows a part of an arm, and the spring holding the fork-rod.
Figure 3:
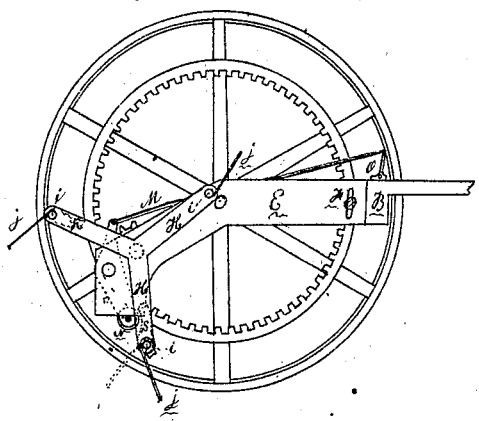

Figure 3, sheet 2, shows a transverse section, near the middle, looking toward the gear end.

At A are the thills, attached to a frame, B, said frame having short axles, for the wheels C, and supporting a seat, D, for a driver.

E is an arm, pivoted to the frame B, at the axle, and is adjustable, by a slat and screw, at F, the other end of frame B being similarly constructed. The back end of these arms E support the reel, with its fork-rods, and a tripping arrangement.

G is the shaft of the reel, having a pinion, by which it receives motion from the wheel C'.

H H are arms of the reel, of which any desirable number may be used, each pair carrying a rod, i, of forks between them, the forks being attached to the rod, and the rod retained in place by a spring, L, which allows the rod to be turned half round when tripped, and returns it to place or former position.

On the end of each rod is a tripping-dog, S.

On the arm E is pivoted the lever N, which has a connection, M, to the lever O, which has a handle, P, convenient to the driver's seat.

This lever N is so placed, that when in the position shown, it shall cause the dogs, on passing its lower end, to give the fork-rods a partial turn or trip; and when the handle P is turned to p, the lever N turns up to n, out of the way, allowing the dogs to pass freely.

j j are the forks, fast to the rods i i, and held in such position as may be best for each kind of work.

In operation, when the horse is attached, the arms E are adjusted by the screws at F, so that the forks play near the ground, and the machine is driven over the hay. The gear revolves the reel, and as the rods pass, the dogs hit the tripping-lever, and give the rods a partial turn or trip, and the spring returns them to place as soon as released. This gives a toss to the hay, and brings the forks to the best position to clear. When not wanted, the lever is turned up out of the way.

I claim—

1. The adjustable tripping-lever N, in combination with the dogs S and rods i, carrying tedder-forks.

2. The adjustable tripping-lever N, in combination with the dogs S, rods i, and return-spring L.

3. The arrangement of the hand-lever O and connecting-rod m, or their equivalents, in combination with the adjustable tripping-lever N, dogs S, and rods i.

E. W. NICHOLS.

Witnesses:
J. G. ARNOLD,
C. M. NILES.